United States Patent
Mitsuyasu

(10) Patent No.: US 8,476,548 B2
(45) Date of Patent: Jul. 2, 2013

(54) METHOD OF CUTTING OUT PART WITH MAKING PARTIALLY WELDED SPOTS IN WIRE-CUT ELECTRICAL DISCHARGE MACHINING

(75) Inventor: Takashi Mitsuyasu, Fukuoka-ken (JP)

(73) Assignee: Seibu Electric & Machinery Co. Ltd., Koga-Shi, Fukuoka-Ken (JP)

( * ) Notice: Subject to any disclaimer, the term of this patent is extended or adjusted under 35 U.S.C. 154(b) by 0 days.

(21) Appl. No.: 13/325,390

(22) Filed: Dec. 14, 2011

(65) Prior Publication Data

US 2012/0193326 A1  Aug. 2, 2012

(30) Foreign Application Priority Data

Jan. 28, 2011  (JP) .................... 2011-016692
Sep. 28, 2011  (JP) .................... 2011-212221

(51) Int. Cl.
*B23H 7/10*  (2006.01)

(52) U.S. Cl.
USPC .................... 219/69.12; 219/69.13

(58) Field of Classification Search
USPC .............. 219/69.12, 69.13, 69.17, 69.18
See application file for complete search history.

(56) References Cited

U.S. PATENT DOCUMENTS

| | | | | |
|---|---|---|---|---|
| 5,242,555 A | * | 9/1993 | Buhler | 219/69.12 |
| 5,556,554 A | * | 9/1996 | Morishita | 219/69.12 |
| 2007/0205184 A1 | * | 9/2007 | Mazumder et al. | 219/69.17 |
| 2008/0203069 A1 | * | 8/2008 | Kao et al. | 219/69.17 |

FOREIGN PATENT DOCUMENTS

| | | | |
|---|---|---|---|
| JP | 05-4118 A | * | 1/1993 |
| JP | 06-210530 A | * | 8/1994 |
| JP | 2000-280124 A | | 10/2000 |
| JP | 2001-310217 A | * | 11/2001 |
| JP | 3366509 B2 | | 1/2003 |
| JP | 3521283 B2 | | 4/2004 |
| JP | 4480822 B2 | | 6/2010 |

* cited by examiner

*Primary Examiner* — Geoffrey S Evans
(74) *Attorney, Agent, or Firm* — Browdy and Neimark, PLLC

(57) ABSTRACT

A method of cutting out a part from a workpiece with making partially welded spots in wire electrical discharge machining to keep the part against falling apart away from the workpiece. There is no need to cut anew the welded spot left as in the conventional process. The cut-out parts are cut off at a time after breakage of the welded spots caused by an external impact. The electric processing condition applied across an inter-electrode space between the wire electrode and the workpiece is changed from a cutting phase to a welding phase in which the wire electrode is fused partially at some spots along a cutting path of a predetermined contour on the workpiece to weld together the cut-out part and the workpiece at the fused spot on the wire electrode.

12 Claims, 8 Drawing Sheets

METHOD OF CUTTING OUT PART WITH MAKING PARTIALLY WELDED SPOTS IN WIRE-CUT ELECTRICAL DISCHARGE MACHINING

FIELD OF THE INVENTION

The present invention relates generally to a wire electrical discharge machining to cut out a part or product from workpiece of strips, plates or sheets by spark discharge energy occurring when a gap voltage is applied across a wire electrode and a workpiece, and, more particularly, this invention relates to a method of producing the part with making partially welded spots integral with the workpiece in electrical discharge machining to keep the machined parts or products against falling away from the workpiece.

BACKGROUND OF THE INVENTION

In conventional wire-cut electrical discharge processors in which a part or product is cut off by spark discharges occurring between a wire electrode and a workpiece of cemented carbide, hardened steel and so on, a wire electrode before the onset of electrical discharge is threaded through a starting hole pierced in advance in the cut-out part or workpiece and, while wire electrical discharge machining is being done, is fed constantly into a discharge cutting zone where the part or product is made in any desired shape. The workpiece in, for example immersion wire electrical discharge machining process, is immersed in the medium and clamped on a worktable. With the electrical discharge machining process of the type in which the wire electrode is threaded through the discharge cutting zone in the part or workpiece, the part or product is cut off from the workpiece in a phase the electrical discharge machining circuit is held closed.

A conventional wire-cut electrical discharge machining process is disclosed in, for example JP patent No. 3 366 509 in which the first machining phase and the second cut-off phase are both carried out with only one processing program. With the prior wire-cut electrical discharge machining process, a pathway program, uncut amount and reversing amount to cut off every male pattern are set and input. The first machining phase comes to rest with leaving the uncut amount and stores the spot. In the second machining phase to cut off the uncut amount, the wire electrode after having gotten back from the stored spot along the cutting path or kerf by the programmed uncut amount makes automatic connection and resumes the electrical-discharge at the site to cut off the male pattern.

In Japanese Laid-Open Patent Application No. 2000-280 124 which is a commonly-assigned senior application, there is disclosed a wire electrical discharge machining process to cut out a part or product on the basis of a machining program set previously. The uncut distance left shortly before completion of machining is determined in relation to the shape of specific part or product according to the previously set machining program. With the prior wire electrical discharge machining process, the programming for machining process can be swift and simple. Moreover, the determination of the uncut distance best for the machined shape is proved effective in certainly preventing the product from falling apart from the workpiece.

In Japanese Patent No. 3 521 283 which is a commonly-assigned senior application, there is disclosed a wire electrical discharge machining equipment in which the small part or product is automatically ejected following the machining phase. The control unit for wire-electrode travel, while moving the wire electrode based on the predetermined machining pathway, controls the electrical discharge spacing between the wire electrode and the workpiece, outputting an alarm signaling the completion of retreating phase to cease the machining operation, making the alarm signal invalid after the wire-electrode travel has ended, and activates the ejector controller after the end of the wire-electrode travel to eject the cut-out part out of the workpiece.

In another Japanese Patent No. 4 480 822 which is a commonly-assigned senior application, the immersion wire electrical discharge machining processor is disclosed in which the buoyancy member supports the part or product cut out from the workpiece to prevent the short-circuit which would be otherwise occur between the cut-out part and the wire electrode, thereby supporting a heavy part in safety. The buoyancy member less in specific gravity than processing liquid is underneath the workpiece. The buoyancy developed in the buoyancy member owing to the processing liquid floats the parts cut out from the workpiece by the wire electrode so as not to sink in the processing liquid.

With the wire electrical discharge machining process as stated earlier, however, the workpiece isn't cut across a matter of more than a few millimeters in the first machining phase. Subsequently, the machining process shifts to the next cutting phase to shape a desired contour of the part and then isolate completely the part from the workpiece. The part is further transferred to finish-cut phase. With machining process as stated just above, the part with uncut spots has to be cut out from the workpiece by the electrical discharge process. Upon the prior electrical discharge machining to produce the part of preselected shape, the part has to be cut out with leaving uncut spots to keep the part against falling apart away from the workpiece or scrap. Thus, the prior electrical discharge machining has need of an additional step to isolate finally the part apart from the workpiece and an additional device for recovery of the products of workpiece. When leaving intact the uncut spots in return for isolation of the part, there is a risk that the part going to be cut out from the workpiece gets tilted relative to the clamped workpiece shortly before the end of machining process, whereby the short circuit occurs between the wire electrode and the workpiece, causing an interruption of electrical discharge and/or an abnormal discharge, which would cause damages to the processed surface of the workpiece. When completely cutting out the part from the workpiece, there would be an adverse possibility that the workpiece couldn't be attracted magnetically or the workpiece, even though attractable magnetically, is too heavy in weight to be supported with any practical magnetic force.

Looking at the electrical discharge phenomenon of a qualitatively long interval which causes a breakdown between the metal electrodes lying in a gaseous insulator, it was found that the breakdown starts with a corona discharge phase, then going through a spark discharge phase and an arc discharge phase in sequence, and ends in the breakdown. Thus, it has been developed to control voltage-current characteristics so as to conduct the discharge machining at the spark discharge and the arc welding or plasma welding at the arc discharge or plasma discharge. Based on the consideration of the discharge phases as stated just above, the technical concept is motivated in which the wire electrode is used for the electrical discharge machining to cut out the part from the workpiece and for arc welding to make a coalescence of the part with the workpiece.

SUMMARY OF THE INVENTION

The present invention, therefore, has as its primary object to overcome the problem as described just above and to provide a method of producing a cut-out part with making partially welded spots integral with a workpiece or scrap in electrical discharge machining, in which an electrical discharge conditions are varied at more than one spot during a preselected shaping of the part to fuse partially an outside circular surface of a wire electrode, making a coalescent part of the cut-out part with the workpiece or scrap around the spot to keep the part against falling apart away from the workpiece and thereafter the coalescent spot is broken with external force, instead of conventional way to cut the uncut spot anew with electrical discharge machining. The method of the present invention as stated earlier shorten the totality of machining time, thereby improving the machining efficiency while protecting the part or product from damages.

The present invention is concerned with a method of cutting out a part with making partially welded spots in wire electrical discharge machining in which a wire electrode unwound from a source bobbin is threaded through a workpiece lying below an upper head and further a lower head lying below the workpiece in opposition to the upper head, and then the wire electrode is fed through a guide member lying downstream of the lower head towards a waste-wire hopper; comprising the steps of, changing electrical processing condition applied across the wire electrode and the workpiece from a cutting phase to a welding phase at more than one spot in a cutting path or kerf of a predetermined contour on the workpiece to fuse partially the wire electrode at the spot, and welding together the workpiece and the part cut out from the workpiece at the spot with using the fused wire electrode, thereby keeping the cut-out part at the spot against falling away apart from the workpiece.

In the present invention, there is provided a method of cutting out a part with making partially welded spots in wire electrical discharge machining, in which an electric current fed through the wire electrode to weld together the cut-out part and the workpiece at the spot is applied with a long pulse less at a peak current amount compared with an electric current in the cutting phase to carry out the wire electrical discharge machining whereby the machining discharge shifts to an arc discharge to fuse the wire electrode to weld together the workpiece and the cut-out part with using the fused wire electrode.

In the present invention, there is provided a method of cutting out a part with making partially welded spots in wire electrical discharge machining, in which the electrical processing condition is controlled to cut the workpiece while making a coalescence between the workpiece and the cut-out part at the spot where workpiece and the cut-out part are opposite to each other, and the coalescence after discharge machining has been completed is broken with an external impact to cut off the cut-out part away from the workpiece.

In the present invention, the method of cutting out a part with making partially welded spots in wire electrical discharge machining is carried out with an electric circuitry constructed as follows. More especially, changing the electrical processing condition is carried out with an electric circuitry which has a first circuit in which an inter-electrode space between the wire electrode and the workpiece is connected in series with a low-voltage load combined with a resistance to confirm an inter-electrode state and a 1st switch, a second circuit in which the space between the wire electrode and the workpiece is connected in series with a high-voltage load for the electric discharge machining and a 2nd switch, and a third circuit in which the space between the wire electrode and the workpiece is connected in series with a 1st diode and a 3rd switch, and the first, second and third circuits being connected in parallel with each other, whereby phase-change from the cutting phase to the welding phase is executed by ON•OFF control of the switches. Moreover, the cutting phase on the workpiece is executed by the steps of turning on the 1st switch to energize the low-voltage load to apply a potential difference across the inter-electrode space between the wire electrode and the workpiece, and then turning off the 1st switch is turned off and turning on the 2nd switch to energize the high-voltage load thereby executing the cutting phase on the workpiece. Further, the welding phase on the workpiece is executed by the steps of turning on the 1st switch and the 3rd switch to energize the low-voltage load to apply a potential difference across the inter-electrode space between the wire electrode and the workpiece, then, keeping the 3rd switch turned on while turning off the 1st switch and turning on the 2nd switch to energize the high-voltage, and finally turning off the 2nd switch while keeping the 3rd switch turned on to release energization of the high-voltage load to appl a circulating current across the inter-electrode space between the workpiece and the wire electrode to generate an electric current long in pulse width, thereby making the coalescence between the cut-out part and the workpiece.

As an alternative, the method of cutting out a part with making partially welded spots in wire electrical discharge machining is carried out with an electric circuitry constructed as follows. More especially, changing the electrical processing condition is carried out with an electric circuitry which is composed of a first circuit in which an inter-electrode space between the wire electrode and the workpiece is connected in series with a low-voltage load combined with a resistance to confirm an inter-electrode state and a 1st switch, a second circuit in which the inter-electrode space between the wire electrode and the workpiece is connected in series with a high-voltage load for the electric discharge cutting, a 4th switch and a 5th switch, a third circuit in which the inter-electrode space between the wire electrode and the workpiece is connected in series with a 2nd diode and a 5th switch, and a fourth circuit in which a inter-electrode space between the wire electrode and the workpiece is connected in series with a 3rd diode and a 4th switch, and the first, second, third and fourth circuits being connected in parallel with each other, whereby the phase-change from the cutting phase to the welding phase is executed by ON•OFF control of the switches. With this alternative, the cutting phase on the workpiece is executed by the steps of turning on the 1st switch to energize the low-voltage load to apply a potential difference across the inter-electrode space between the wire electrode and the workpiece, then turning off the 1st switch and turning on the 4th switch and the 5th switch to energize the high-voltage load thereby executing the cutting phase on the workpiece. Further, the welding phase on the workpiece is executed by the steps of turning on the 1st switch to energize the low-voltage load to apply a potential difference across the inter-electrode space between the wire electrode and the workpiece, then turning on the 4th switch and the 5th switch while turning off the 1st switch to energize the high-voltage, and then keeping the 4th switch and the 5th switch turned on to keep energization of the high-voltage, and finally turning off the 11th switch while keeping the 5th switch tuned on to release energization of the high-voltage load to apply a circulating current across the inter-electrode space between the workpiece and the wire electrode to generate an electric current long in pulse width, thereby making the coalescence between the cut-out part and the workpiece.

In the present invention, there is provided a method of cutting out a part with making partially welded spots in wire electrical discharge machining, in which the fused part in the wire electrode to weld together the cut-out part and the workpiece is limited to only a wire periphery of the wire electrode to make certain that the wire electrode is fed continuously without interruption even after the wire electrode has been partially fused to weld the cut-out part with the workpiece. In another aspect of the present invention, moreover, there is provided a method of cutting out a part with making partially welded spots in wire electrical discharge machining, in which upon breakage of the wire electrode at the partially fused part to weld the cut-out part with the workpiece, the wire electrode is newly resupplied into cutting path or kerf at a breakage spot to continue the welding phase or the cutting phase.

ADVANTAGEOUS EFFECTS OF THE INVENTION

With the method of cutting out a part with making partially welded spots in wire electrical discharge machining of the present invention, there is no need of cutting anew in the uncut spot left in the cutting path or kerf as in the conventional process and therefore the completely cut-out part or product is made easily in a single discharge machining operation. The welded spot to keep the cut-out part together with the workpiece is not as tough as stock workpiece material, but so vulnerable or fragile as to be easily broken by any weak external impact to completely cut off the part or product away from the workpiece. The method of the present invention as stated earlier, because of having no necessity of cutting anew the uncut spot again with electrical discharge machining, makes it possible to shorten the totality of machining time, thereby improving the machining efficiency. Further, the method of the present invention is effective to prevent the part or product from tilting and/or falling, which would cause damages to the part and/or workpiece.

Meanwhile, the electrical discharge phenomenon of a qualitatively long interval causing a breakdown between the metal electrodes lying in a gaseous insulator and the breakdown starts with a corona discharge phase, then going through a spark discharge phase and an arc discharge phase in sequence, and ends in the breakdown. With the electrical discharge machining on the workpiece, moreover, the discharge cutting of the workpiece is carried out by ending the current supply at the timing of spark discharge. With the welding phase in the machining process of the present invention to make coalescent spot or welded spot in the cutting path, the cut-out part is welded with the workpiece with the arc welding at an arc discharge range, following the discharge machining of the workpiece at a spark discharge range. The wire electrode under the arc discharging cutting is fused partially around the periphery thereof to provide filler material. Thus, the workpiece is machined with electrical discharge along the cutting path of the wire electrode in parallel with the feed direction of the wire electrode and the part cut just before with the discharge machining is welded with the filler material by sequential arc discharge whereby the cut-out part is welded together with the workpiece.

BRIEF DESCRIPTION OF THE DRAWINGS

FIG. 3(A) is a wave form chart showing a voltage wave form and a current wave form in an ordinary machining cycle in basic circuit of FIG. 2 and FIG. 3(B) is a wave form chart showing a voltage wave form and a current wave form in a welding cycle in basic circuit of FIG. 2 to make a coalescent spot or a welded spot between the part and the workpiece.

FIG. 5(A) is a wave form chart showing a voltage wave form and a current wave form in an ordinary machining phase in the circuit of FIG. 4 and FIG. 5(B) is a wave form chart showing a voltage wave form and a current wave form in a welding phase in circuit of FIG. 4 to make a coalescent spot or a welded spot between the part and the workpiece.

FIG. 7(A) shows the parts of rectangular shape cut out from the workpiece along a cutting line starting with a start hole and welded together with the workpiece at two spots and FIG. 7(B) is an exaggeratingly enlarged view in perspective showing the workpiece in which dotted lines depict cutting or machining tracks of the tool or the wire electrode in the electrical discharge machining process.

FIG. 9(A) is a flow diagram to carry out a method of cutting the part with making welded spots in the wire electrical discharge machining according to the present invention and FIG. 9(B) is a flow diagram to carry out a method of cutting the part with leaving uncut spots in the conventional wire-cut electrical discharge machining.

DETAILED DESCRIPTION OF THE PREFERRED EMBODIMENTS

Figure 1:
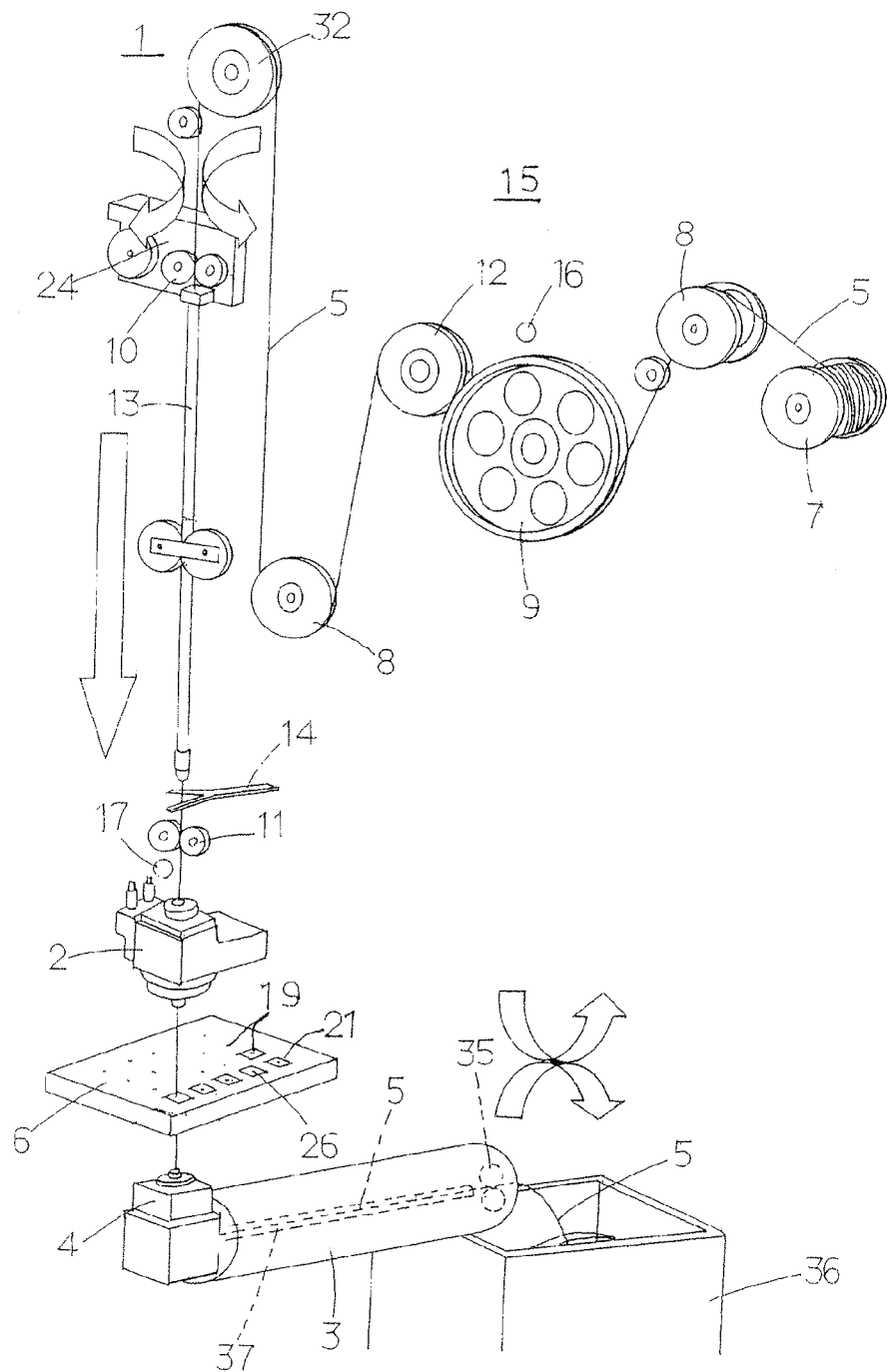
FIG. 1 is a schematic view illustrating a preferred embodiment of a wire electrical discharge processor operated according to a method of cutting out a part with making welded spots in wire-cut electrical discharge machining.

A method of cutting out a part with making welded spots in wire electrical discharge machining according to the present invention is befitted to use in a wire electrical discharge processor to cut out a part with making the welded spots to keep the cut-out part against falling away apart from a workpiece by spark discharge energy occurring when the processing potential is applied across a wire electrode and the workpiece. A preferred embodiment of the wire electrical discharge processor to carry out the method of cutting the part with making welded spots in wire electrical discharge machining according to the present invention will be hereinafter described in detail with reference to FIG. 1. The wire-cut electrical discharge processor is generally composed of a source bobbin 7 mounted on a machine frame 15 and having wire electrode coils 5 wound around the bobbin 7, change-of-direction rollers 8 to control threading directions of the wire electrode 5 unwound out of the bobbin 7, a brake roller 9 to keep the delivery of the wire electrode better, a tension roller 12 to apply a tensile force to the delivered wire electrode 5 and a guide roller 32 to turn the wire electrode 5 towards a feeder tube 13. The wire electrode 5, after moving past the change-of-direction rollers 8 and the guide roller 32 in a wire-supply system, travels through a pair of wire-delivery rollers 10 serving as annealing rollers installed in a machine head 1, a feeder tube 13 suspended below a wire-electrode delivery unit 24 and a pair of common rollers 11 in order as stated above to stretch between the wire-delivery rollers 10 and the common rollers 11. Then, after the wire electrode 5 is firmly gripped by the wire-delivery rollers 10 and the common rollers 11, an electric current from a power source is applied to the wire electrode 5 through an electric feeder brush 18, see FIGS. 2 and 4, to flow through the wire-delivery rollers 10, wire electrode 5 and the common rollers 11, thereby annealing the wire electrode 5 extending between the wire-delivery rollers 10 and the common rollers 11 to remove stresses. An end of the wire electrode 5, not subjected to the heat-treatment of annealing, is cut off with a cutter 14 to be removed. Subsequently, as the feeder tube 13 suspended below a tube holder in the wire-electrode delivery unit 24 continues descending in response to the energization of the wire delivery rollers 10, the annealed wire electrode 5 is guided along the feeder tube 13 and threaded through an upper head 2.

Between the annealing rollers 10 and the common rollers 11, there is provided the cutter 14 to cut off the end of the wire electrode 5 at the renewal of wire-end to render the wire electrode 5 preferable for threading, the breakage of the wire electrode 5, the execution of annealing process and so on. Moreover, there is installed a clamp, not shown, to dispose the waste wire-electrode 5 cut off by the cutter 14 which is actuated with a cutter unit to cut the wire electrode 5. Upon the resumption of threading after the breakage of the wire electrode 5, the wire-delivery rollers 10 rotate at a low velocity to advance the wire electrode 5 through the feeder tube 13 into the upper head 2. The wire electrode 5, after having advanced past the upper head 2, is threaded through a start hole, cutting path or kerf 19 in the workpiece 6 and then received in a lower head 4 lying below the workpiece 6 in opposition to the upper head 3. After the wire electrode 5 has been threaded past the lower head 4, the wire delivery rollers 10 was shifted to high-speed rotation to advance the wire electrode 5 out of the lower head 4. The wire electrode 5 pulled out of the lower head 4 is led in turn through a change-of-direction roller, a wire guide tube 37, a water separator located at an egress of the wire guide tube 37, all of which are installed inside the lower arm 3. Further, the wire electrode 5 is pulled out by winding rollers 35 lying downstream of the water separator and successively forced into a waste-wire hopper 36 by means of any suction means farther downstream of the winding rollers. An encoder 16 to detect the rpm of the brake roller 9 is installed on the brake roller 9 and a sensor 17 is installed on a lower supporter, not shown, of the machine head 1 to monitor any distortion, bending, threading conditions and so on caused in the wire electrode 5.

The workpiece 6 processed in the wire-cut electric discharge machining of the present invention is selected from, for example, iron series or carbide products. The wire electrode is metallic material including for example tungsten series, copper alloy series (brass family), piano wires and so on.

Figure 7:
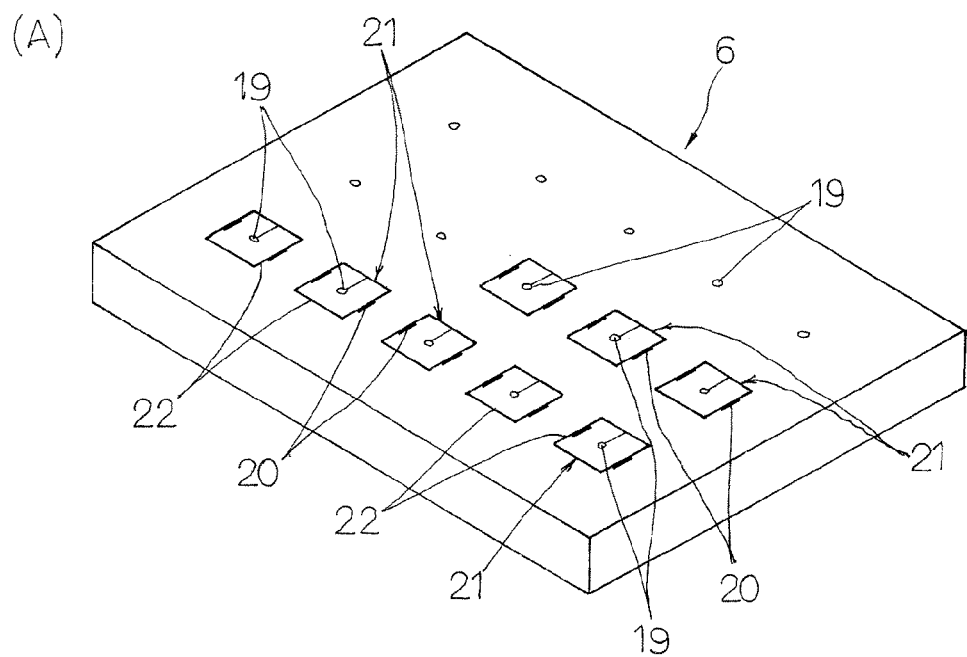
FIG. 7 is a schematic diagram illustrating a geometric relation between the cut-out parts and the workpiece in a method of cutting the part with making welded spots in wire-cut electrical discharge machining.
Figure 7:
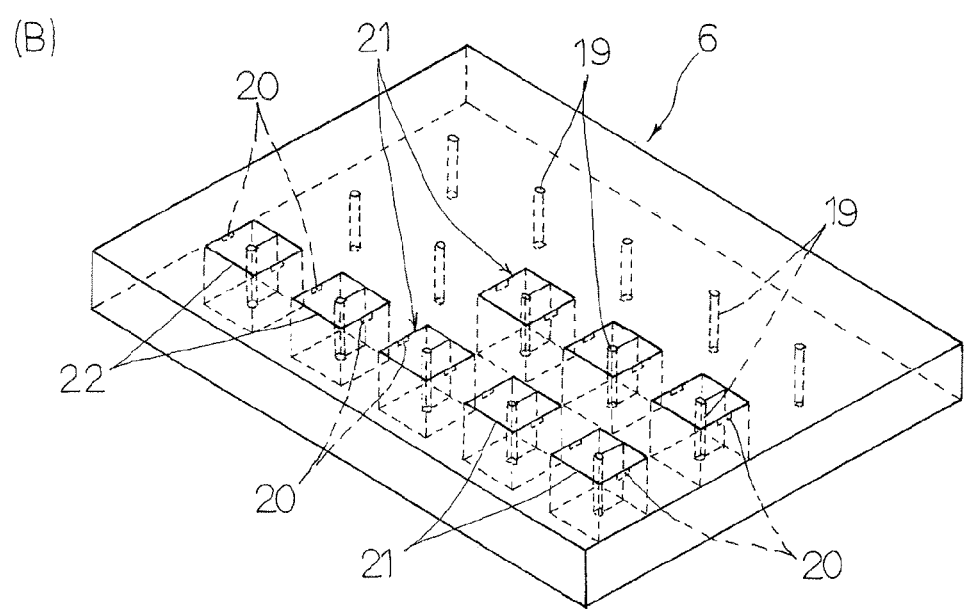

As an alternative, a composite material may be used in which the metallic material as stated earlier is used as a core member and clad with other metallic member. For example, the core member made of material other than copper alloy family is clad with copper alloy family. In contrast, the core member made of copper alloy family is clad with zinc family and so on. With the embodiment discussed now, the workpiece 6 is made in a flat sheet or plate as shown in FIG. 7. The wire electrode 5, after threaded through any of the start holes 19 and cutting paths or kerfs, is supplied with an electric current via the electrical feeder brush 18 and a potential difference is applied across the wire electrode 5 and the workpiece 6 to carry out the electrical-discharge machining of the workpiece, thereby the cut-out part or product 26 is produced.

In the threading phase in which the wire electrode 5 is introduced successively through the upper head 2, start hole or kerf cut in the workpiece 6 and the lower head 4, the foremost edge of the wire electrode 5 sometimes comes into abutment or collision against any one of the member as stated just earlier, failing to thread through across all the members. When the wire electrode 5 gets buckled, warped or bent because of the abutment of the wire electrode 5 against any of the members as stated just above, the distortion occurring in the wire electrode 5 is detected with sensor 17.

More especially, the potential difference is applied across the wire delivery rollers 10 and an upper end of a guide-tube holder or the sensor 17. Thus, when the wire electrode 5 comes into contact with the sensor 17, the distortion in the wire electrode 5 is detected with sensor 17. The wire electrode 5 is applied with potential difference under such condition that the wire-delivery rollers 10 are fed with electricity while the wire-delivery rollers 10 are closed each other to grip the wire electrode 5 between them. Thus, the abutment or collision of the wire electrode 5 applied with potential difference can be detected with the sensor 17.

A method of cutting out a part from a workpiece with making welded spots in wire-cut electrical discharge machining according to the present invention, although aimed at cutting out the part 26 along the desired contour 21 from the workpiece 6, is especially features the steps of fusing partially the wire electrode 5 in the cutting path or kerf to make fused area on the wire electrode 5 to weld the cut-out part 26 with the workpiece 6 to keep temporarily the cut-out part 26 in the workpiece 6. The fused area in the wire electrode 5 is limited to only a wire periphery over a predetermined length of the wire electrode 5 to make certain that the wire electrode 5 is fed continuously without interruption even after the wire electrode 5 has been partially fused to weld together the cut-out part 26 with the workpiece 6. In the method of cutting the workpiece with making welded spots of the present invention, the wire electrode 5 containing copper alloy series is better for the welding of the cut-out part 26 with the workpiece 6. According to the method of cutting out the part from the workpiece with making welded spots, the wire-delivery rollers 10 mounted on the machine head 1 pinch between them the wire electrode 5 unwound from the source bobbin 7 installed on the machine frame 15. As the wire-delivery rollers 10 is driven, the wire electrode 5 is threaded through the feeder tube 13, upper head 2, workpiece 6 set below the upper head 3 and the lower head 4 lying just below the workpiece 6 in opposed alignment with the upper head 3. The wire electrode 5 is further pulled out by the winding rollers 35 to run through the guide unit lying below the lower head 4 into the waste-wire hopper 5. More especially, the electrical processing condition to apply the potential difference across the wire electrode 5 and the workpiece 6 is switched from the cutting or machining phase to the welding phase at more than one spot, for example two spots in the embodiment discussed here, in the cutting path or kerf 21 to define a predetermined contour of the workpiece 6. In the welding phase of the electrical processing condition, the wire electrode 5 is fused partially to provide welded spots 20 at preselected locations in the cutting path 21, where the part 26 is welded together with the workpiece 6 to be held in the workpiece 6 so as not to fall apart from the workpiece 6. As the welded spots 20 between the part 26 and the workpiece 6 as shown in FIG. 7 are placed diametrically opposite with each other, the part 26 is kept in well-balanced posture inside the workpiece 6. With the method of cutting out the part 26 from the workpiece 6 with making welded spots of the present invention, moreover, the wire electrode 5 can break in the welding phase where the wire electrode 5 is fused to weld together the cut-out part 26 and the workpiece 6. Upon breakage of the wire electrode 5, the wire electrode 5 is newly resupplied into cutting path or kerf 22 at the breakage spot to continue welding of the workpiece 26 with the workpiece 6. As an alternative, the electrical-discharge machining or cutting may be followed by means of the newly resupplied wire electrode 5. The cut-out part 26, according to circumstances, is either of the products and the scraps.

Figure 3:
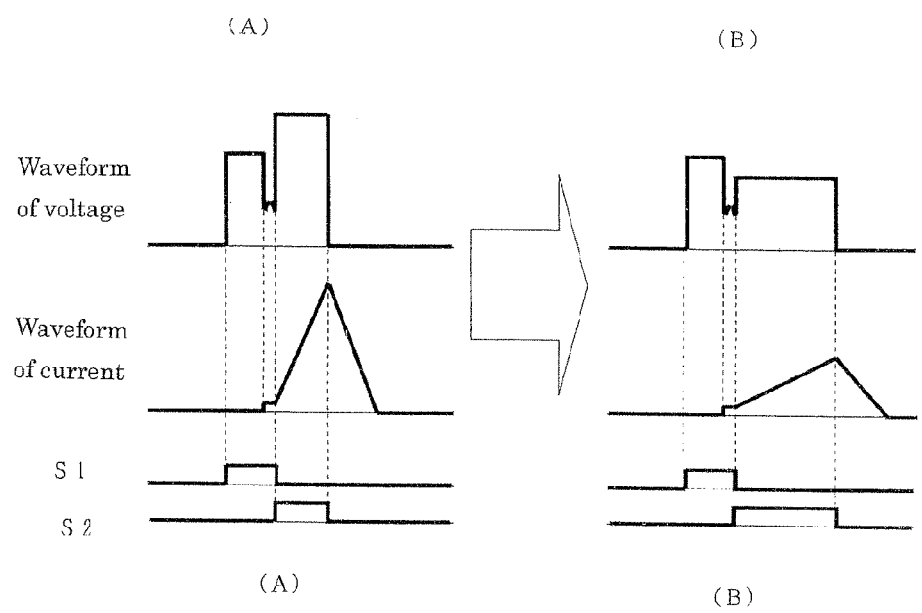
FIG. 3 is a wave form chart illustrating a voltage wave form at the upper and a current wave form at the lower on ON•OFF control of switches S1 and S2 in the circuit of FIG. 2.
Figure 5:
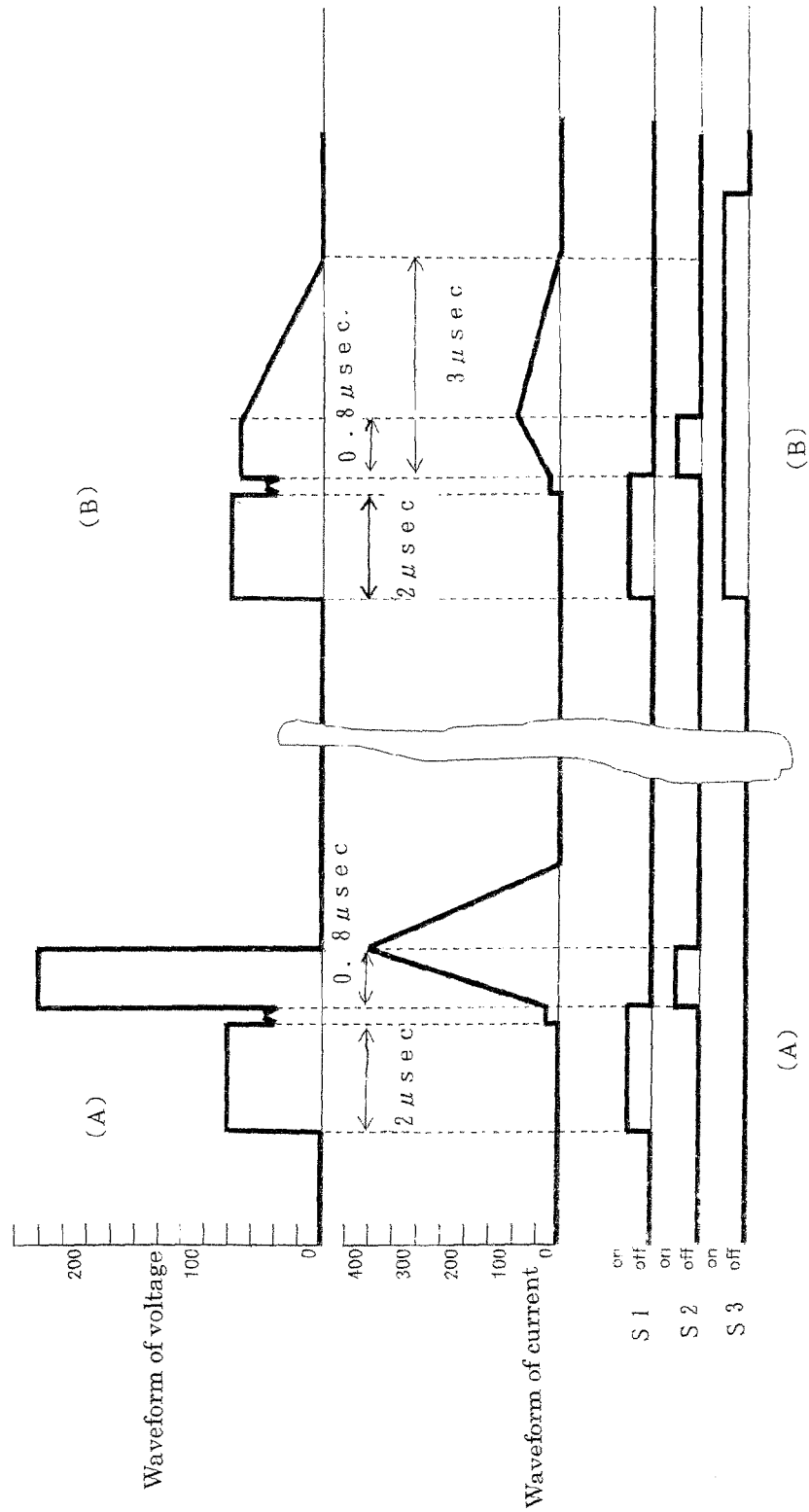
FIG. 5 is a wave form chart illustrating a voltage wave form at the upper and a current wave form at the lower on ON•OFF control of switches S1, S2 and S3 in the circuit of FIG. 4.

On switching of the electrical processing condition from the cutting phase to the welding phase, a current flow (A) into the wire electrode 5, as seen in FIGS. 3 and 5, is controlled in such a way that a peak current flowing from a high-voltage load HV into the wire electrode 5 is decreased down to, for example about a quarter compared with the current in the wire electrical discharge machining to cut the workpiece 6, and a potential difference (V) applied across the wire electrode 5 and the workpiece 6 is reduced to, for example about a quarter compared with the voltage in the wire electrical discharge machining to cut the workpiece 6. Moreover, a pulse of the current flow into the wire electrode 5 is varied to, for example about a twice in pulse width. As a result, the electrical processing condition is shifted from the cutting phase to the welding phase in which the welded spot or coalescence 20 is produced between the cut-out part 26 and the workpiece 6 by an arc welding with the use of the wire electrode 5. With the electrical processing condition in the welding phase, the workpiece 6 is cut to produce the part 26 and at the same time the part 26 partially is weld together with the workpiece 6 to make the welded spot or the coalescence 20 along their opposite portions. The opposite portions here mean any edge portions of the workpiece 6 and the cut-out part 26 confronting each other across the cutting path of kerf 21. The welded spots with the wire electrode 5 are made offset or biased on the workpiece 6 towards either of one surface of the workpiece 6 closer to the upper head 2 and the opposite surface of the workpiece 6 closed to the lower head 4. Moreover, the welded spot 20 of the cut-out part 26 with the workpiece 6, because made on only the edge (only upper side in FIG. 7), can be easily broken with a bit of impact. After completion of the electrical discharge machining, the welded spots 20 are broken with external impact. Thus, the application of external impact on the part 26 causes breakage of the welded spots 20, making it easier to cut off the part 26 apart from the workpiece 6.

Figure 8:
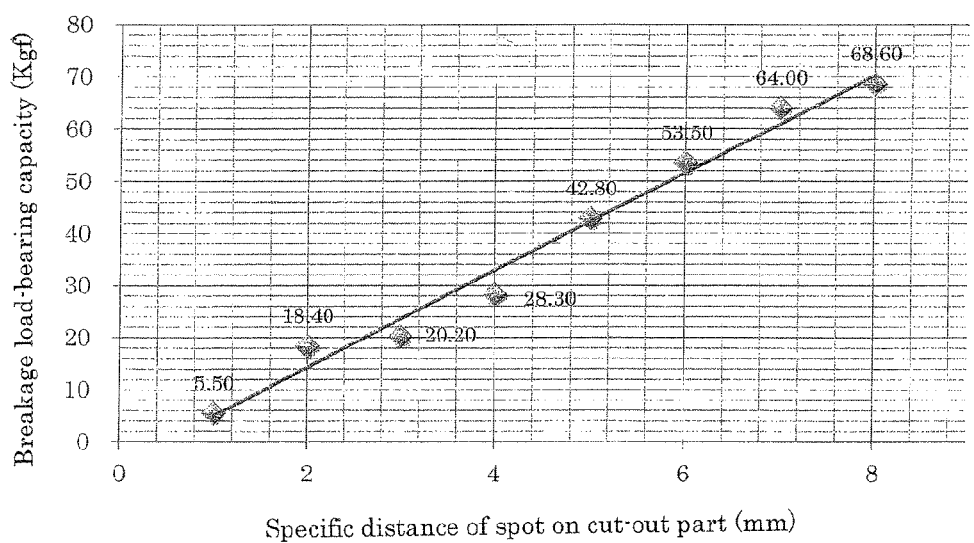
FIG. 8 is a graphic representation showing the result of withstand load tests to break the welded spots made between the cut-out part and the workpiece.

With the method of cutting out the part from the workpiece with making welded spots according to the present invention, the welded spots 20 of the cut-out part 26 with the workpiece 6 can be broken with the weak impact as stated earlier. The breakage load-bearing capacity on the welded spots 20 of the part 26 with the workpiece 6 was as shown in FIG. 8. The experimental data in FIG. 8 was conducted using the workpiece 6 which had the parts of 8 square millimeters therein. The welded spots 20 on opposite sides of the square of the cut-nut parts 26 were 2 millimeters in length. The specified distance (mm) of the welded spot 20 is plotted on the abscissa while the breakage load-bearing capacity (Kgf) is on the ordinate.

The basic principle of the method of cutting the workpiece with making welded spots in the wire electrode discharge machining according to the present invention will be described later with reference to FIGS. 2 and 3. Moreover, the concrete embodiments in the method of cutting out the part from the workpiece with making welded spots in the wire electrode discharge machining according to the present invention will be described with reference to FIGS. 4 and 5.

Especially in FIG. 5, the quantitative figures in FIG. 5 regarding 1st switch S1, 2nd switch S2 and 3rd switch S3 should be considered to be only illustration for better understanding of this invention. Moreover, the voltage wave form (V) and the current wave form (A) themselves also should be considered to be by way of illustration only. Thus, it is to be noted that the duration of time to keep the 1st switch S1 "ON" is not settled in conformity with the discharge condition, but determined depending on the state between the wire electrode 5 and the workpiece 6, for example parameters varying according to the power source for discharge processing, quality of the wire electrode 5, diameter of the wire electrode 5, and quality, thickness and so on of the workpiece 6. The duration of time to keep the 1st switch S1 "ON", although normally a few μ sec or tens of μ sec, is represented as 2μ sec by way of illustration only in the following description of the machining or cutting phase and the welding phase. Next, the duration of time to keep the 2nd switch S2 "ON", although determined in conformity with the cutting condition or parameter inputs, is represented as 0.8μ sec by way of illustration only in the following description of the cutting phase and welding phase. In FIG. 5(B), moreover, the current flow intervals of the current wave form and the time intervals of impressed voltage of the voltage wave form, although not determined with the cutting or machining condition and unsettled, is represented as 3μ sec by way of illustration only in the following description of the machining or cutting phase and the welding phase.

Figure 2:
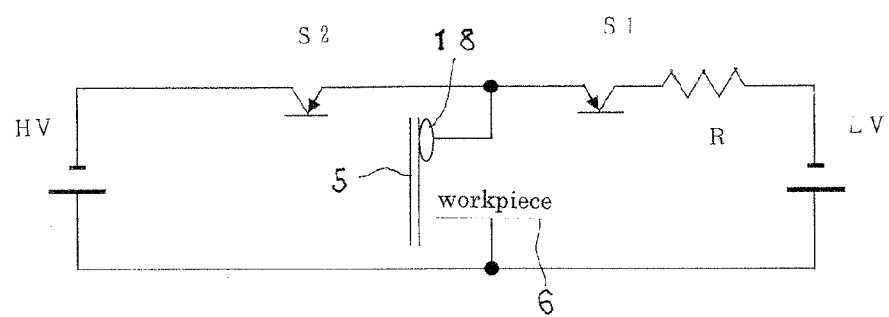
FIG. 2 is a circuit diagram to show a basic circuitry to carry out the method of cutting out a part with making welded spots in wire electrical discharge machining.

Referring to FIG. 2, there is shown an electric circuitry having a first circuit in which an inter-electrode space between the wire electrode 5 and the workpiece 6 is connected in series with a 1st switch S1 and a low-voltage load LV combined with a resistance R to confirm the inter-electrode state between the charged electrodes, and a second circuit in which the space between the wire electrode 5 and the workpiece 6 is connected in series with a 2nd switch S2 and a high-voltage load HV for the electric discharge processing, and the first and second circuits being connected in parallel with each other. The first circuit is provided to mainly confirm the state of the inter-electrode space between the wire electrode 5 and the material 6. More especially, the first circuit is a detector to determine whether the wire electrode 5 is kept at a correct geometric relation with the workpiece 6 to carry out the electrical-discharge processing. The function of the resistance R is to adjust the amount of electricity flowing through the first circuit. The switch S1 is ON•OFF controlled in time for in advance to the electrical-discharge machining of the workpiece 6. In contrast, the second circuit is provided for the discharge processing or machining and has no resistance therein because of ensuring a large amount of electricity at discharge machining of the workpiece 6.

Next, the cutting or machining phase and the welding phase in the method of cutting the workpiece with making welded spots in the wire electrode discharge machining according to the present invention will be explained in detail later.

In the ordinary cutting or machining phase shown in FIG. 3(A), after the 1st switch S1 has been turned on to generate a pulse, a matter of 80V of the low-voltage load LV is created across the inter-electrode space between the wire electrode 5 and the workpiece 6 for about 2μ sec to confirm whether the wire electrode 5 is kept at a correct geometric relation with the workpiece 6. When the inter-electrode relation is in adequate condition, the discharge occurs across the space between two charged electrodes. Subsequently, the 1st switch S1 is turned off and the 2nd switch S2 is turned on to generate a pulse to get a current of, for example a matter of 400V flowing for about 0.8μsec to the wire electrode 5 and about 240V of the high-voltage load HV is impressed across the inter-electrode space between the wire electrode 5 and the workpiece 6 to machine or cut the workpiece 6 by spark discharge.

In the welding phase shown in FIG. 3(B) to make a coalescence or a welded spot between the cut-cut part 26 and the workpiece 6, after the 1st switch S1 has been turned on to generate a pulse, about 80V of the low-voltage load LV is created across the inter-electrode space between the wire electrode 5 and the workpiece 6 for about 2μ sec to confirm whether the wire electrode 5 is kept at a correct geometric relation with the workpiece 6. When the inter-electrode relation is in adequate condition, the discharge occurs across the space between two charged electrodes. Then, the 1st switch S1 is turned off and the 2nd switch S2 is turned on to generate a pulse to get a current of, for example, a matter of 110V flowing for about 3μ sec to the wire electrode 5, and about 70V or a quarter the voltage in the cutting phase of the high-voltage load HV is applied across the inter-electrode space between the wire electrode 5 and the workpiece 6 to generate an arc discharge to fuse the wire electrode 5, producing coalescence to weld together the cut-out part 26 and the workpiece 6.

The technical concept and basic construction of the method of cutting out the part from the workpiece with making welded spots in the wire electrode discharge machining according to the present invention will be described later with reference to FIGS. 2 and 5. The basic circuitry to accomplish the method of cutting out the part from the workpiece with making welded spots in the wire electrode discharge machining according to the present invention is composed of a first circuit in which an inter-electrode space between the wire electrode 5 and the workpiece 6 is connected in series with a low-voltage load LV combined with a resistance R to confirm an inter-electrode state between charged electrodes and a 1st switch S1, a second circuit in which the space between the wire electrode 5 and the workpiece 6 is connected in series with a high-voltage load HV for the electric discharge cutting and a 2nd switch S2, a third circuit in which the space between the wire electrode 5 and the workpiece 6 is connected in series with a first diode D1 and a 3rd switch S3, and the first, second and third circuits being connected in parallel with each other. With the circuitry constructed as stated just earlier, phase-change from the cutting phase to the welding phase is executed by ON•OFF control of the switches S1, S2 and S3.

With the cutting phase to machine the workpiece 6 by the wire electrode 6 in wire-electrode discharge processor having the basic circuitry as stated earlier, the 1st switch S1 is turned on to energize the low-voltage load LV to apply a potential difference across the inter-electrode space between the wire electrode 5 and the workpiece 6. Then, the 1st switch S1 is turned off and the 2nd switch S2 is turned on to energize the high-voltage load HV to execute the cutting phase. With the welding phase to weld together the cut-out part 26 and the workpiece 6, the 1st switch S1 is turned on while the 3rd switch S3 is kept turned on to energize the low-voltage load LV to apply a potential difference across the inter-electrode space between the wire electrode 5 and the workpiece 6. Then, the 1st switch S1 is turned off and the 2nd switch S2 turns on to energize the high-voltage load HV and finally the 2nd switch S2 is turned off to execute the welding phase. With the ON•OFF control of the switches as stated earlier, the electrical processing condition is switched over from the voltage/ampere wave form of the cutting phase in which the wire electrode 5 cuts the workpiece 6 to another voltage/ampere wave form of the welding phase in which the cut-out part 26 is welded together with the workpiece 6. In the welding phase, although the 2nd switch S2 is turned off after a lapse of a fixed interval of time, the 3rd switch S3 remains "ON" and therefore a circulating current passing through the first diode D1 and the 3rd switch S3 flows across the inter-electrode space between the workpiece 6 and the wire electrode 5 to generate an electric current long in pulse width. As a result, the spark condition turns into the arc discharge by which the wire electrode 5 makes the coalescence spot or the welded spot between the cut-out part 26 and the workpiece 6 to weld together the part 26 with the workpiece 6.

Figure 4:
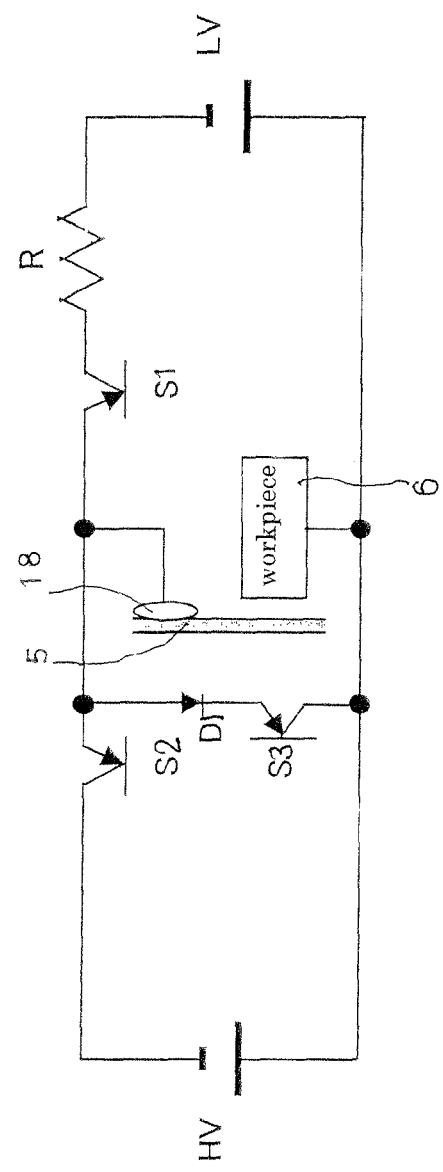
FIG. 4 is a schematic wiring diagram explaining an embodiment of the principle of the method of cutting out a part with making the welded spots in wire electrical discharge machining according to the present invention.

The cutting or machining phase in the method of cutting out the part from the workpiece with making welded spots in the wire electrode discharge machining according to the present invention will be explained later with reference to Table 1 together with FIGS. 4 and 5(A).

TABLE 1

|  | S1 | S2 | S3 | LV | HV |
|---|---|---|---|---|---|
| 1st Step | ON | OFF | OFF | LOAD | UNLOAD |
| 2nd Step | OFF | ON | OFF | UNLOAD | LOAD |
| 3rd Step | OFF | ON | OFF | UNLOAD | LOAD |
| 4th Step | OFF | OFF | OFF | UNLOAD | UNLOAD |

In 1st step, the 1st switch S1 is turned on to energize the low-voltage load LV. After the lapse of time, for example about 2μ sec, the discharge occurs between the inter-electrode space between the wire electrode 5 and the workpiece 6.

In 2nd step, after the 2nd switch S2 has been turned on, the voltage drop triggers off the application of the high-voltage load HV and the electric current rises to cause the spark discharge in which the cutting or machining of the workpiece 6 by the wire electrode 5 is carried out.

In 3rd step, the electrical-discharge machining time between the wire electrode 5 and the workpiece 6, though determined dependent on processing condition of the workpiece 6, is for example about 0.8μ sec.

In 4th step, after the 1st, 2nd and 3rd switches S1, S2 and S3 have been once turned off, the potential difference across the inter-electrode space between the wire electrode 5 and the workpiece 6 becomes lost in load, resulting in downtime. The cutting path or kerf 21 in the workpiece 6 is completed by the wire electrode 5 through repetition of the cycle of the steps as stated just above with the period of 125 k~2000 kHz.

The welding phase in the method of cutting out the part from the workpiece with making welded spots in the wire electrode discharge machining according to the present invention will be explained later with reference to Table 2 together with FIGS. 4 and 5(B).

TABLE 2

|  | S1 | S2 | S3 | LV | HV |
|---|---|---|---|---|---|
| 1st Step | ON | OFF | ON | LOAD | UNLOAD |
| 2nd Step | OFF | ON | ON | UNLOAD | LOAD |

TABLE 2-continued

|  | S1 | S2 | S3 | LV | HV |
|---|---|---|---|---|---|
| 3rd Step | OFF | OFF | ON | UNLOAD | UNLOAD |
| 4th Step | OFF | OFF | OFF | UNLOAD | UNLOAD |

In 1st step, the 1st switch S1 is turned on to energize the low-voltage load LV. After the lapse of time, for example about 2μ sec, the discharge occurs between the inter-electrode space between the wire electrode 5 and the workpiece 6.

In 2nd step, after the 2nd switch S2 has been turned on, the voltage drop triggers off the application of the high-voltage load HV and the electric current rises to cause the spark discharge in which the cutting or machining of the workpiece 6 by the wire electrode 5 is carried out.

In 3rd step, upon change-over from the machining phase to the welding phase, the 2nd switch S2 is turned off after the lapse of a fixed interval of time. However, the 3rd switch S3 remains "on" and, therefore, a circulating current flows across the inter-electrode space between the workpiece 6 and the wire electrode 5 to generate an electric current long in pulse width, when the wire electrode 5 fuses to produce coalescence or the welded spot between the cut-out part 26 and the workpiece 6, thereby welding the cut-out part 26 with workpiece 6.

In 4th step, after the circulating current has been consumed completely, the 3rd switch S3 is turned off, resulting in downtime.

Figure 6:
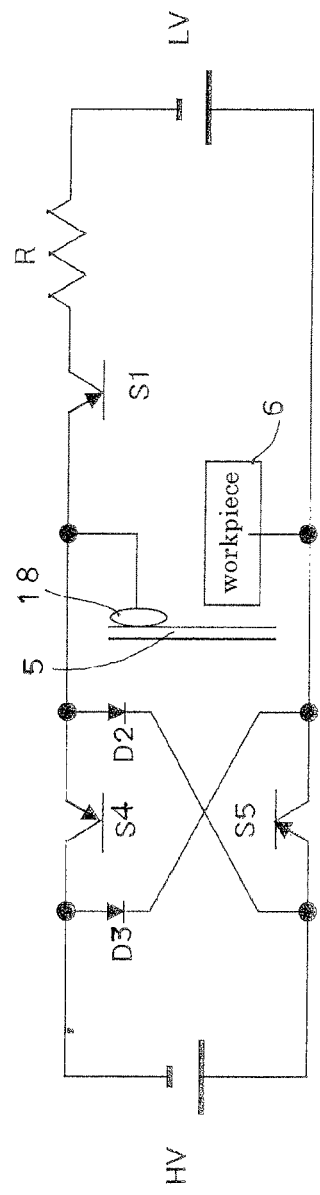
FIG. 6 is a schematic wiring diagram explaining an embodiment to carry out the method of cutting out the part with making the welded spots in wire electrical discharge machining according to the present invention.

A preferred embodiment of the electric circuitry to carry out the method of cutting out the part from the workpiece with making welded spots in the wire electrode discharge machining according to the present invention will be described later with reference to FIG. 6. Here, the voltage waveforms and the current waveforms occurring on the ON•OFF control of the 1st, 2nd, 3rd, 4th and 5th switches S1, S2, S3 and S4 in the electric circuitry of FIG. 6 are left out.

The embodied circuitry to accomplish the method of cutting out the part from the workpiece with making welded spots in the wire electrode discharge machining according to the present invention is composed of a first circuit in which an inter-electrode space between the wire electrode 5 and the workpiece 6 is connected in series with a low-voltage load LV combined with a resistance R to confirm an inter-electrode state between charged electrodes and a 1st switch S1, a second circuit in which the inter-electrode space between the wire electrode 5 and the workpiece 6 is connected in series with a high-voltage load HV for the electric discharge cutting, a 4th switch S4 and a 5th switch S5, a third circuit in which the inter-electrode space between the wire electrode 5 and the workpiece 6 is connected in series with a 2nd diode D2 and a 5th switch S5, and a fourth circuit in which an inter-electrode space between the wire electrode 5 and the workpiece is connected in series with a 3rd diode D3 and a 4th switch S4, and the first, second, third and fourth circuits being connected in parallel with each other. With the circuitry constructed as stated just earlier, when the 4th and 5th switches S4 and S5 are turned on, the inter-electrode space between the wire electrode 5 and the workpiece 6 is energized with the high-voltage load HV.

Change-over of the electrical processing condition from the machining or cutting phase to the welding phase in the electric circuitry constructed as stated earlier is executed with the ON•OFF control of the 1st, 4th and 5th switches S1, S4 and S5. After the 4th switch S4 has turned off under the condition the 5th switch S5 has been kept at "OFF" state, a first circulating current passing through the 2nd diode D2 and the 5th switch S5 flows across the inter-electrode space between the wire electrode 5 and the workpiece 6. In contrast, after the 5th switch S5 has turned off under the condition the 4th switch S4 has been kept at "ON" state, a second circulating current passing through the 3rd diode D3 and the 4th switch S4 flows across the inter-electrode space between the wire electrode 5 and the workpiece 6. In the electric circuitry discussed now, the first and second circulating currents are allowed to flow alternately with the ON•OFF control of the 1st, 4th and 5th switches S1, S4 and S5. With the method of cutting out the part from the workpiece with making welded spots in the wire electrode discharge machining according to the present invention, as two circulating currents are generated by using the electric circuits having the diodes D2 and D3 therein, the waveform of the current for discharge machining nears trapezoidal shape. Thus, alternate occurrence of the two circulating currents makes it possible to lessen a problem of generation of heat caused by switching action. With the method of cutting out the part with making welded spots, as the cut-out part 26 and the workpiece 6 are welded together by using the circulating currents, the wave form of the current can be lowered more slowly, compared with the discharge machining of the workpiece 6. Moreover, the ON•OFF timing of the 4th and 5th switches S4 and S5 may be revered as will be stated later.

The cutting or machining phase in the method of cutting out the part from the workpiece with making welded spots in the wire electrode discharge machining according to the present invention will be explained later with reference to Table 3 together with FIGS. 3 and 6.

TABLE 3

|  | S1 | S4 | S5 | LV | HV |
|---|---|---|---|---|---|
| 1st Step | ON | OFF | OFF | LOAD | UNLOAD |
| 2nd Step | OFF | ON | ON | UNLOAD | LOAD |
| 3rd Step | OFF | OFF | ON | UNLOAD | LOAD |
| 4th Step | OFF | OFF | ON | UNLOAD | UNLOAD |
| 5th Step | OFF | OFF | OFF | UNLOAD | UNLOAD |

In 1st step, the 1st switch S1 is turned on to energize the low-voltage load LV. After the lapse of time, for example about 2μ sec, the discharge occurs between the inter-electrode space between the wire electrode 5 and the workpiece 6.

In 2nd step, the 1st switch S1 is turned off and the 4th and 5th switches S4 and S5 are turned on. The voltage drop triggers off the application of the high-voltage load HV and the electric current rises to cause the spark discharge in which the cutting or machining of the workpiece 6 by the wire electrode 5 is carried out.

In 3rd step, the 4th and 5th switches S4 and S5 are kept at the "ON" state and the electrical-discharge machining time between the wire electrode 5 and the workpiece 6, though determined dependent on processing condition of the workpiece 6, is for example about 0.8μ sec.

In 4th step, after the 5th switch S5 has been kept at the "ON" state and the 4th switch S4 has been turned off, the 5th switch S5 is kept "ON" state for sub-μ sec and the energization of the high-voltage HV is released whereby the waveform of the current is neared to the trapezoidal shape.

In 5th step, after the 1st, 4th and 5th switches S1, S4 and S5 have been once turned off, the potential difference across the inter-electrode space between the wire electrode 5 and the workpiece 6 becomes lost in load, resulting in downtime. The cutting path or kerf 21 in the workpiece 6 is completed by the wire electrode 5 through repetition of the cycle of the steps as stated just above with the period of 125 k~2000 kHz.

The welding phase in the method of cutting out the part from the workpiece with making welded spots in the wire electrode discharge machining according to the present invention will be explained later with reference to Table 4 together with FIG. 6.

TABLE 4

|  | S1 | S4 | S5 | LV | HV |
|---|---|---|---|---|---|
| 1st Step | ON | OFF | OFF | LOAD | UNLOAD |
| 2nd Step | OFF | ON | ON | UNLOAD | LOAD |
| 3rd Step | OFF | ON | ON | UNLOAD | LOAD |
| 4th Step | OFF | OFF | ON | UNLOAD | UNLOAD |
| 5th Step | OFF | OFF | OFF | UNLOAD | UNLOAD |

In 1st step, the 1st switch S1 is turned on to energize the low-voltage load LV. After the lapse of time, for example about 2μ sec, the discharge occurs between the inter-electrode space between the wire electrode 5 and the workpiece 6.

In 2nd step, after the 4th switch S4 and the 5th switch S5 have been turned on, the voltage drop triggers off the application of the high-voltage load HV and the electric current rises to cause the spark discharge in which the cutting or machining of the workpiece 6 by the wire electrode 5 is carried out.

In 3rd step, the 4th and 5th switches S4 and S5 are kept at the "on" state and the discharge occurs for the discharge time determined depending on the processing condition, for example a matter of 0.8μ sec.

In 4th step, the 4th switch S4 is turned off after the lapse of a fixed interval of time. However, the 5th switch S5 remains "on" state and, therefore, a circulating current flows across the inter-electrode space between the workpiece 6 and the wire electrode 5 to release the energization of the high-voltage load HV to generate an electric current long in pulse width, when the arc is maintained between the workpiece 6 and the cut-out pary 26 to weld together them In 5th step, after the circulating current has been consumed completely, the 5th switch S5 turns off, resulting in downtime.

A specific number of the welded spots 20 between the workpiece 6 and the cut-out part 26 in the welding phase may be determined depending on the size of the part 26. A matter of overriding concern is that the cut-out part 26 is kept against separating or falling apart from the workpiece 6. Moreover, it doesn't matter slight tilt of the cut-out part 26 with respect to the workpiece 6. For instance, when the cut-out part 26 is of small in side and light in weight, it can be sustained at only one on the workpiece 6. In contrast, if the cut-out part 26 is of large and heavy, the number of the welded spots 20 has to be selected to hold the cut-out part 26 in better balance on the workpiece 6.

The method of cutting out the part from the workpiece with making welded spots in the wire electrode discharge machining according to the present invention is adaptable to either of die operations the workpiece 6 is the desired part or product that remains after operation and the cut-out part 26 is the scrap, and punching or piercing operations the part 26 is the desired part or product that remains after operation, and the workpiece 6 produced is the scrap. In FIG. 7, holes 19 such as start holes are each made in the cut-out part 26 and therefore the part 26 is the scrap. As an alternative, when the part 26 is the desired part or product that remains after operation, the start hole 19 isn't made in the part 26, but in the workpiece 6 which is scrap.

A cumulative discharge-processing time required for the method of cutting out the part from the workpiece with making welded spots in the wire electrode discharge machining according to the present invention will be explained later, compared with the conventional discharge machining with reference to FIG. 9(A) and FIG. 9(B). In the method of the present invention recited here, the holes 19 such as start holes are each made in the cut-out part 26 and therefore the part 26 is the scrap and the workpiece 6 is the part or product that remains after operation.

Figure 9:
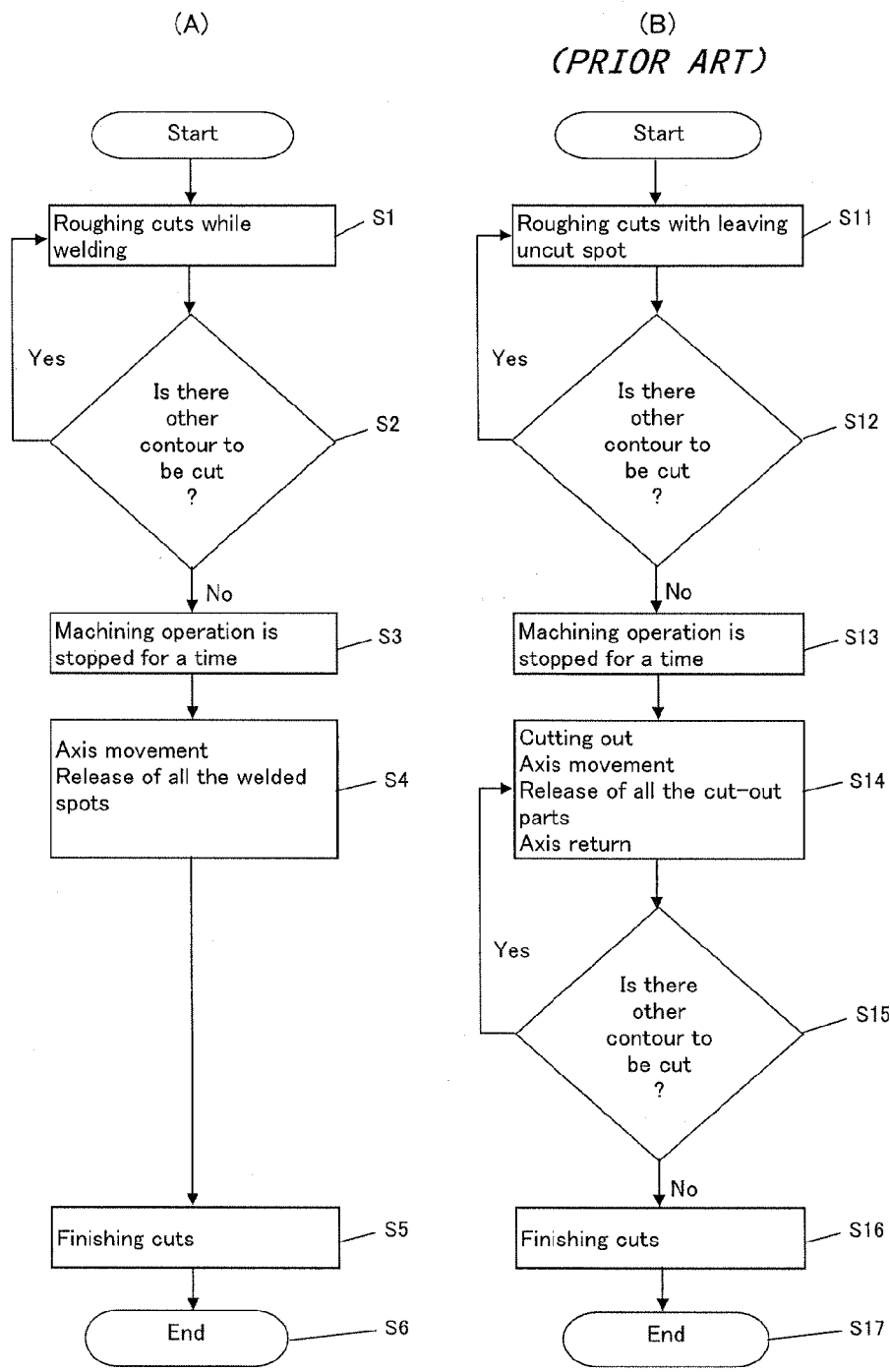
FIG. 9 is a flow diagram to carry out a method of cutting out the part with making welded spots in the wire-cut electrical discharge machining.

First, referring to FIG. 9(A), there is illustrated the electrical-discharge machining of the present invention. In step S1, roughing cuts are carried out on the workpiece 6 with making coalescence or the welded spot of a specific distance at any spot. The wire electrode 5 while in roughing cutting or machining is fused at more than one spot, two spots in the illustration, to make coalescent or welded spots 20 to weld the cut-out part 26 with the workpiece 6. The arc welding while continuing with discharge cutting of the workpiece 6 is carried out to make the welded spots or coalescent spots 20 at which the workpiece 6 would be otherwise uncut in the conventional method. As a result, the part 26 is cut out from the workpiece 6 with leaving the welded spots 20. In step S2, determining whether a part 26 to be cut along the cutting path or kerf 21 remains still in the workpiece 6. If the part 26 to be cut exists, the step S1 resumes. The step S1 is repeated till all of the parts 26 are cut with the discharge machining process. In contrast, if there is no part 26 to be cut sequentially, the step goes ahead. In step S3, after the roughing cuts have been entirely completed on the workpiece 6, the wire electrode 5 moves towards the first cutting path 21 and automatic discharge machining in the wire electrical discharge processor once stops. In step S4, an operator moves a work table by axis movement into a location to separate the part 26 apart away from the workpiece 6. There, every cut-out part 26 is knocked off the workpiece 6 at a time by any external force. In step S5, the workpiece 6 is finally processed in finishing cuts. In the wire electrode discharge machining conducted as stated earlier, a task for which the operator is ever tied down on the wire electrode discharge processor is only the step to separate the part 26 apart away from the workpiece 6. Thus, the majority of the steps are carried out on automatic way except for a few seconds required for the step to separate the part 26 apart away from the workpiece 6.

Next referring to FIG. 9(B), there is illustrated the conventional electrical-discharge machining. In step S11, roughing cuts by the electrical discharge machining are carried out on the workpiece 6 with leaving more than one uncut spot across a specific distance, when the cut-out part 26 is held at the uncut spot on the workpiece 6 and therefore kept against falling apart away from the workpiece 6. In step S12, determining whether a part 26 to be cut along the cutting path or kerf 21 remains still in the workpiece 6. If the part 26 to be cut exists, the step S11 resumes. The step S11 is repeated till all of the parts 26 are cut with the discharge machining process. In contrast, if there is no part 26 to be cut sequentially, the step goes ahead. In step S13, after the roughing cuts have been entirely completed on the workpiece 6, the wire electrode 5 moves towards the first cutting path 21 and automatic discharge machining in the wire electrical discharge processor once stops. In step S14, the operator resumes the program to cut off the uncut spot. In step S14, after the cut-off of the uncut spot has completed, the program is stopped. Then, the wire electrical discharge processor is switched to manual mode and the work table is moved in Z-direction to remove every cut-out part 26 from the workpiece 6 by either manual or automatic operation. Next, the workpiece 6 is put back to the original position and the program is started. In step S15, determining whether there still remains other cutting path or kerf 21 of the part 26 having the uncut spot therein. If the cutting path 21 to be cut completely exists, the step S14 resumes. The step S14 is repeated till all of the uncut spots in the cutting paths 21 are cut with the discharge machining process. In step 16, finishing cuts are carried out.

With comparing the present invention and the prior art regarding the method of cutting out the part from the workpiece with making uncut spots in the wire electrode discharge machining, it was found that the electrical-discharge machining of the present invention could drastically cut the time of discharge machining as contrasted with the conventional method of discharge machining.

For example, in case 100 cutting paths of kerfs 21 of a preselected square contour were made in the workpiece 6, the following results were obtained. In the conventional machining method as stated earlier, it took about 10 minutes for roughing cuts of one cutting path or kerf of square contour, about 3 minutes to cut out one piece of the part 26 away from the workpiece 6 (including a time spent on the axis movement) and about 14 minutes for finishing cuts. Overall, it took 16.7 hours for roughing cuts of 100 cutting path or kerf, 5 hours to cut out the 100 pieces of part 26 away from the workpiece 6 and 23. 3 hours for finishing cuts. With the conventional method executed as stated earlier, the operator had to be ever tied down on the wire electrode discharge processor without getting away from the processor for 5 hours required to cut out the 100 pieces of part 26 away from the workpiece 6. Of about 3 minutes to cut out one piece of the part 26, it took 2 minutes when the discharge processor cut out one piece of the part 26 and 1 minute when the operator inspected the part 26 separated surely from the workpiece 6. The operator, although taking 3.3 hours for standby mode, but couldn't leave the wire electrical discharge processor behind. With the method of the present invention, to the contrary, it took about 11 minutes for roughing cuts of one cutting path or kerf of the same square contour as in the conventional method stated above, about 5 seconds to knock one piece of the part 26 off from the workpiece 6 (including a time spent on the axis movement) and about 14 minutes for finishing cuts. Overall, it took 18.3 hours for roughing cuts of 100 cutting path or kerf, 8.3 minutes to cut out the 100 pieces of the part 26 away from the workpiece 6 and 23. 3 hours for finishing cuts.

Thus, the time required through all the steps shortened by 3.2 hours. Now considering an aspect of increasing productivity of the discharge machining with the wire electrical discharge processor, using the electrical discharge machining of the present invention could not only cut the time it takes to cut out the part by 3.2 hours, but also cut the time when the operator is ever tied down on the wire electrode discharge processor to 0.3% of the overall processing time for all the steps, compared with 11% in the conventional electrical discharge machining. Thus, 99.7% of the overall processing time could be automated in the electrical discharge machining of the present invention.

In programming of the method of cutting out the part from the workpiece with making welded spots in the wire electrode discharge machining according to the present invention, the command to enable the welding step while the roughing cuts was required additionally. Instead, the program to cut off the part was unnecessary, so that the program in the present invention could be more simplified, compared with the program for the conventional method of cutting out the part with leaving uncut spots. Moreover, the method of cutting out the part from the workpiece with making welded spots in the wire electrode discharge machining according to the present invention is adaptable to the punching operations when the part is cut out after the completion of the finishing cuts thereby to accomplish the full-unattended cutting operation. The part, as with the treatment of the cut-out part at the die operation, can be separated away from the workpiece with patting the workpiece after completion of machining.

What is claimed is:

1. A method of cutting out a part with making partially welded spots in wire electrical discharge machining comprising
a wire electrode unwound from a source bobbin is threaded through a workpiece lying below an upper head and further a lower head lying below the workpiece in opposition to the upper head, and
then the wire electrode is fed through a guide member lying downstream of the lower head towards a waste-wire hopper; comprising the steps of,
changing electrical processing condition applied across the wire electrode and the workpiece from a cutting phase to a welding phase at more than one spot of a plurality of spots in a cutting path or kerf of a predetermined contour on the workpiece to fuse partially the wire electrode at the spots, and
welding together the workpiece and the part cut out from the workpiece at the spots with using the fused wire electrode to make a coalescence,
thereby keeping the cut-out part at the spots against falling away apart from the workpiece.

2. A method of cutting out a part with making partially welded spots in wire electrical discharge machining, as set forth in claim 1, wherein an electric current fed through the wire electrode to weld together the cut-out part and the workpiece at the spots is applied with a long pulse less at a peak current amount compared with an electric current in the cutting phase to carry out the wire electrical discharge machining whereby the machining discharge shifts to an arc discharge to fuse the wire electrode to weld together the workpiece and the cut-out part with using the fused wire electrode.

3. A method of cutting out a part with making partially welded spots in wire electrical discharge machining, as set forth in claim 1, wherein the electrical processing condition is controlled to cut the workpiece while making coalescence between the workplace and the cut-out part at the spots where workpiece and the cut-out part are opposite to each other.

4. A method of cutting out a part with making partially welded spots in wire electrical discharge machining, as set forth in claim 1, wherein the coalescence after discharge machining has been completed is broken with an external impact to cut off the cut-out part away from the workpiece.

5. A method of cutting out a part with making partially welded spots in wire electrical discharge machining, as set forth in claim 1,
wherein the fused part in the wire electrode to weld together the cut-out part and the workpiece is limited to only a wire periphery of the wire electrode to make certain that the wire electrode is fed continuously without interruption even after the wire electrode has been partially fused to weld the cut-out part with the workpiece.

6. A method of cutting out a part with making partially welded spots in wire electrical discharge machining, as set forth claim 1, wherein upon breakage of the wire electrode at the partially fused part to weld the cut-out part with the workpiece, the wire electrode is newly resupplied into cutting path or kerf at a breakage spot to continue the welding phase or the cutting phase.

7. A method of cutting out a part with making partially welded spots in wire electrical discharge machining, as set forth in claim 1, wherein changing the electrical processing condition is carried out with an electric circuitry which has a first circuit in which an inter-electrode space between the wire electrode and the workpiece is connected in series with a low-voltage load combined with a resistance to confirm an inter-electrode state and a first switch, a second circuit in which the space between the wire electrode and the workpiece is connected in series with a high-voltage load for the electric discharge machining and a second switch, and a third circuit in which the space between the wire electrode and the workpiece is connected in series with a first diode and a third switch, and the first, second and third circuits being connected in parallel with each other, whereby phase-change from the cutting phase to the welding phase is executed by ON•OFF control of the switches.

8. A method of cutting out a part with making partially welded spots in wire electrical discharge machining, as set forth in claim 7, wherein the cutting phase on the workpiece is executed by the steps of turning on the first switch to energize the low-voltage load to apply a potential difference across the inter-electrode space between the wire electrode and the workpiece, and then turning off the first switch and turning on the second switch to energize the high-voltage load thereby executing the cutting phase on the workpiece.

9. A method of cutting out a part with making partially welded spots in wire electrical discharge machining, as set forth in claim 7, wherein the welding phase on the workpiece is executed by the steps of turning on the first switch and the third switch to energize the low-voltage load to apply a potential difference across the inter-electrode space between the wire electrode and the workpiece, then, keeping the third switch turned on while turning off the first switch and turning on the second switch to energize the high-voltage, and finally turning off the second switch while keeping the third switch turned on to release energization of the high-voltage load to apply a circulating current across the inter-electrode space between the workpiece and the wire electrode to generate an electric current long in pulse width, thereby making the coalescence between the cut-out part and the workpiece.

10. A method of cutting out a part with making partally welded spots in wire electrical discharge machining, as set forth in claim 1, wherein changing the electrical processing condition is carried out with an electric circuitry which is composed of a first circuit in which an inter-electrode space between the electrode and the workpiece is connected in series with a low-voltage load combined with a resistance to confirm an inter-electrode state and a first switch, a second circuit in which the inter-electrode space between the wire electrode and the workpiece is connected in series with a high-voltage load for the electric discharge cutting, a fourth switch and a fifth switch , a third circuit in which the inter-electrode space between the wire electrode and the workpiece is connected in series with a second diode and a fifth switch, and a fourth circuit in which a inter-electrode space between the wire electrode and the workpiece is connected in series with a third diode and a fourth switch, and the first, second, third and fourth circuits being connected in parallel with each other, whereby the phase-change from the cutting phase to the welding phase is executed by ON•OFF control of the switches.

11. A method of cutting out a part with making partially welded spots in wire electrical discharge machining, as set forth in claim 10, wherein the cutting phase is executed by the steps of the cutting phase on the workpiece is executed by the steps of turning on the first switch to energize the low-voltage load to apply a potential difference across the inter-electrode space between the wire electrode and the workpiece, then turning off the first switch and turning on the fourth switch and the fifth switch to energize the high-voltage load thereby executing the cutting phase on the workpiece.

12. A method of cutting out a part with making partially welded spots in wire electrical discharge machining, as set forth in claim 10, wherein the welding phase on the workpiece is executed by the steps of turning on the first switch to energize the low-voltage load to apply a potential difference across the inter-electrode space between the wire electrode and the workpiece, then turning on the fourth switch and the fifth switch while turning off the first switch to energize the high-voltage, and then keeping the fourth switch and the fifth switch turned on to keep energization of the high-voltage, and finally turning off the fourth switch while keeping the fifth switch tuned on to release energization of the high-voltage load to apply a circulating current across the inter-electrode space between the workpiece and the wire electrode to generate an electric current long in pulse width, thereby making the coalescence between the cut-out part and the workpiece.

* * * * *